Nov. 4, 1924.  
F. J. SULLIVAN  
ATTACHMENT FOR MOTOR VEHICLES  
Filed Oct. 16, 1923  
1,513,769

Inventor  
F. J. Sullivan

Patented Nov. 4, 1924.

1,513,769

UNITED STATES PATENT OFFICE.

FRANK J. SULLIVAN, OF OSHKOSH, WISCONSIN.

ATTACHMENT FOR MOTOR VEHICLES.

Application filed October 16, 1923. Serial No. 668,954.

*To all whom it may concern:*

Be it known that I, FRANK J. SULLIVAN, a citizen of the United States, residing at Oshkosh, in the county of Winnebago and State of Wisconsin, have invented certain new and useful Improvements in Attachments for Motor Vehicles, of which the following is a specification.

This invention relates to attachments for motor vehicles, and more particularly to a combined rear view mirror and glare shield.

Motor vehicles are generally provided with a mirror by means of which the traffic in the rear of the vehicle can be seen from the driver's seat, and are frequently provided with various types of glare shields to diffuse rays of light from the headlights of a machine approaching from the opposite direction at night and diffuse the rays of light from the sun when driving in the day time.

An object of the present invention is to provide a single attachment to serve as a combined mirror and glare shield.

In the present invention, I employ a piece of glass provided with a thin coating of silver solution or other material to form a partially transparent mirror through which dense rays of light may pass. The mirror is provided with a backing of colored glass, which will serve to diffuse light rays whereby the device may be arranged in front of the driver when driving against strong rays of light and employed as a glare shield and may be placed to one side and employed as a mirror under ordinary conditions.

It has heretofore been proposed to provide a combined glare shield and mirror consisting of a partially transparent mirror having a thin coating of silver solution and a plain glass arranged behind the mirror. This device is open to the objection that if the silver solution is made sufficiently thin to provide partial transparency, the device as a whole is too transparent when driving in daylight and fails to function as a mirror.

Figure 1:
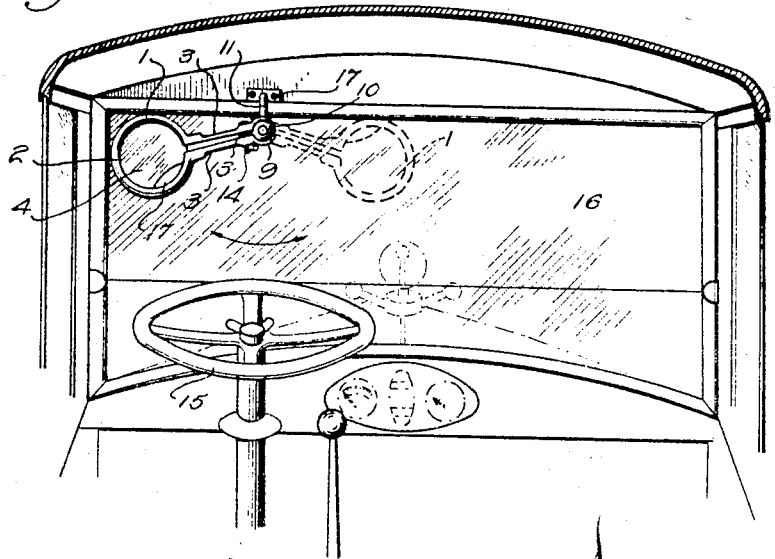
Figure 2:
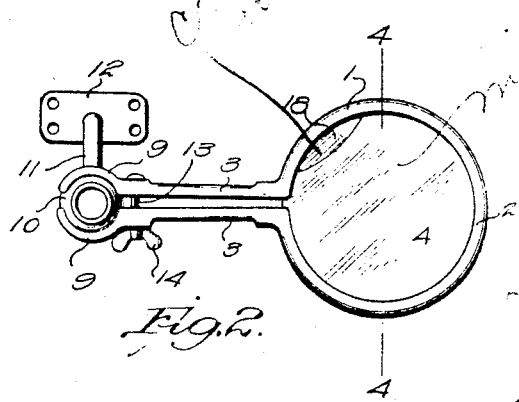
Figure 4:
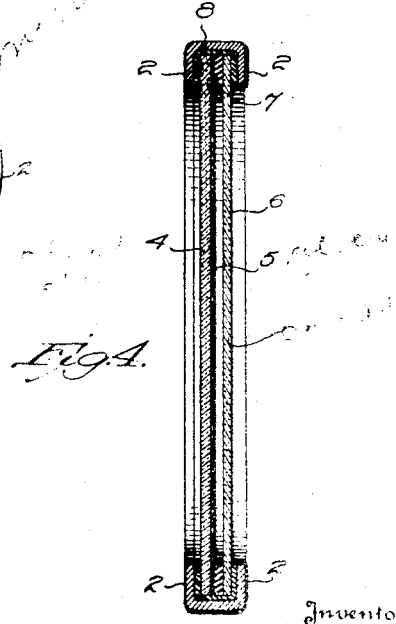
Figure 3:
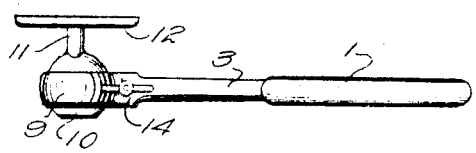

In the accompanying drawings, I have shown one embodiment of the invention.. In this showing:

Figure 1 is a vertical transverse sectional view of a portion of a motor vehicle looking forward from the driver's seat, showing the invention applied, Figure 2 is a front elevation of the mirror removed, Figure 3 is a side elevation, and, Figure 4 is a transverse sectional view on line 4—4 of Figure 2.

Referring in detail to Figures 2 to 4 of the drawings, the reference numeral 1 designates a frame which may be formed in any desired shape and which, as shown, may be circular. This frame is provided with flanges 2 on each side for the reception of the glass forming the mirror and glare shield. Arms 3 are formed on opposite ends of the frame and extend parallel to each other. Within the frame, there is provided a glass 4 having a coating 5 of silver solution or similar material on its rear surface. As stated, in making the mirror, the solution is left on the glass only long enough to give it a light coat. This may be done by thinning the silver solution with distilled water or similar material to provide a partially transparent mirror. In the rear of the mirror, there is provided a sheet of colored glass 6. As shown, the colored glass may be separated from the mirror by means of a gasket 7. This prevents the surface of the colored glass from rubbing against the coating and marring it. The two pieces of glass are fastened to each other by any suitable means, such as a strip of tape running around the periphery of the glass plates.

The ends of the arms 3 are rounded, as at 9, to form a socket. This socket is adapted to fit over a ball 10, carried by an arm 11, secured to a bracket 12. A bolt 13 is passed through the arms adjacent their ends and a wing nut 14 is arranged on the bolt. The device may be arranged in the vehicle adjacent the windshield, as shown in Figure 1 of the drawings. As shown, the vehicle is provided with the usual steering wheel 15 and the driver's seat (not shown) is arranged behind the steering wheel. A windshield 16 is arranged in front of the steering wheel and the bracket 12 is secured above the windshield by means of suitable fastening elements 17. If desired, the sheet of glass 4 forming the mirror may be provided with a portion 18 from which the coating is removed, forming a clear glare shield at this point. With the device in the dotted line position shown in Figure 1 of the drawings, it serves as a mirror. The line of vision from the driver's seat to the mirror is at an angle to the direction of travel of the vehicle and the rays of light striking the back of the mirror are not sufficient to pass through the coating 5. Rays of light are thus reflected from the face of the mirror and the device functions similar to an ordinary mirror. The clear portion 18 permits the driver to see forwardly through the mirror and with the colored glass 6 in the rear of it, serves as a glare shield. When driving against approaching traffic with the rays of light coming from the left, the device may be arranged in the position shown in full lines in Figure 1 of the drawings or may be arranged directly in front of the driver. The rays of light striking the rear of the mirror are then sufficiently strong to penetrate the coating 5 and the device functions the same as an ordinary colored glass glare shield. When driving against the sun in daylight, the device is arranged directly in front of the driver to serve as a glare shield.

It is to be understood that the form of the invention herewith shown and described is to be taken as a preferred example of the same, and that various changes in the shape, size, and arrangement of parts may be resorted to without departing from the spirit of the invention or the scope of the subjoined claims.

I claim:

1. A combined mirror and glare shield comprising a partially transparent mirror, and a light diffusing member arranged in the rear of said mirror.

2. A combined mirror and glare shield comprising a partially transparent mirror, and a sheet of colored glass arranged in the rear of said mirror.

3. A combined mirror and glare shield comprising a glass plate having a portion of its rear face coated to provide a partially transparent mirror and a clear portion, and a light diffusing member arranged in the rear of said plate.

4. A combined mirror and glare shield comprising a glass plate having a portion of its rear face coated to provide a partially transparent mirror and a clear portion, and a plate of colored glass arranged in the rear of said first mentioned plate.

5. A combined mirror and glare shield comprising a partially transparent mirror, a plate of colored glass arranged in the rear of said mirror, and spacing means arranged between said plates.

In testimony whereof, I affix my signature in presence of two witnesses.

FRANK J. SULLIVAN.

Witnesses:
   OTTO R. MAYER,
   ARTHUR SCHALLOCK.